United States Patent [19]

Ostwald

[11] 4,285,417
[45] Aug. 25, 1981

[54] FLOATING CALIPER DISC BRAKE
[75] Inventor: Fritz Ostwald, Buchschlag, Fed. Rep. of Germany
[73] Assignee: ITT Industries, Inc., New York, N.Y.
[21] Appl. No.: 93,789
[22] Filed: Nov. 13, 1979
[30] Foreign Application Priority Data
Dec. 23, 1978 [DE] Fed. Rep. of Germany ....... 2856108
[51] Int. Cl.³ .............................................. F16D 65/02
[52] U.S. Cl. ................................... 188/73.3; 188/73.5
[58] Field of Search ...................... 188/71.1, 73.3, 73.5
[56] References Cited
U.S. PATENT DOCUMENTS

| 3,625,314 | 12/1971 | Rinker | 188/73.5 |
| 4,084,665 | 4/1978 | Burnett | 188/73.3 |

FOREIGN PATENT DOCUMENTS

| 2160056 | 6/1972 | Fed. Rep. of Germany | 188/73.5 |
| 2250742 | 4/1974 | Fed. Rep. of Germany | 188/73.5 |
| 2250843 | 4/1974 | Fed. Rep. of Germany | 188/73.3 |
| 1207328 | 9/1970 | United Kingdom | . |
| 1223989 | 3/1971 | United Kingdom | . |
| 1257026 | 12/1971 | United Kingdom | . |
| 1359989 | 7/1974 | United Kingdom | 188/73.5 |
| 1462381 | 1/1977 | United Kingdom | . |
| 1483290 | 8/1977 | United Kingdom | . |
| 1497048 | 1/1978 | United Kingdom | . |
| 1532572 | 11/1978 | United Kingdom | . |

Primary Examiner—Edward R. Kazenske
Attorney, Agent, or Firm—John T. O'Halloran; Alfred C. Hill

[57] ABSTRACT

A caliper guide for a floating caliper disc brake comprising guide grooves and projecting parts with either the guide grooves or projecting parts being elastically deformable under the action of the braking force to thereby break loose particles of corrosion or dirt present on the guide surfaces.

5 Claims, 4 Drawing Figures

FLOATING CALIPER DISC BRAKE

BACKGROUND OF THE INVENTION

This invention relates to a floating caliper disc brake including a stationary brake support and a floating caliper slidable coaxially with respect to the axis of the brake disc in two straight-line guides, wherein the straight-line guides are a guide groove in the one component and a projecting part on the other component and wherein measures are taken to permit an elastic displacement of the floating caliper transversely with respect to the guide direction by action of the brake torque.

A floating caliper disc brake of this type is described in U.S. Pat. No. 3,625,314. The straight-line guides of the brake support are very critical parts of floating caliper disc brakes. For braking it is necessary for the floating caliper to be slidable as easily as possible and rattling in its straight-line guides must be avoided. During braking, the floating caliper must not tilt. This occurs easily since the braking torque urges the brake caliper with a high force into one of its two straight-line guides, while the brake-actuating piston tries to displace the floating caliper still further. Taking into consideration further that floating caliper disc brakes, owing to their necessary arrangement in the wheel dish of automotive vehicles, are exposed to contaminants and corrosive media, such as salt water, to a great extent, it will become evident that it is very difficult to meet all these requirements without raising the price of the floating caliper disc brake disproportionately.

U.S. Pat. No. 3,625,314 referred to above discloses a floating caliper brake wherein the brake caliper extends with projecting parts into grooves of the brake support. Resilient angle sheet iron parts are inserted into these grooves. The brake shoes of the known floating caliper disc brake are attached to the floating caliper, and bear additionally against the brake support. Consequently, when braking, the brake caliper initially floats in the direction of the brake torque until it abuts against a firm stop in one of its straight-line guides. The clearance in the other straight-line guide is not increased by this displacement of the brake caliper, since the brake support includes resilient parts and the brake shoes are arranged to bear against it such that the straight-line guide of the brake support—being opposite to the actuation direction of the brake torque—is displaced in the direction of the brake torque and thus follows the displacement of the brake caliper.

The design of this prior known floating caliper disc brake is very complicated and as a consequence expensive to manufacture. A floating caliper disc brake design will be substantially simpler if the brake shoes exclusively bear against the brake caliper. Such a design is shown in e.g. U.S. Pat. No. 3,616,879. The straight-line guides of this design are concave molds in the brake support, into which the brake caliper extends with one guide projecting part. The guide projecting parts are each embraced by a guide steel sheet, which is axially fixed in the concave molds. The brake caliper is thus displaced on actuation of the brake with its guide projecting parts relative to the guide steel sheets.

In this prior known floating caliper brake there is the danger that the guide projecting parts cannot be shifted any more on the guide steel sheets if corroded or dirty which is the case in automotive vehicles that have not been in use for a long time.

As a result, the brake can initially be actuated to a reduced degree only, and with increasing wear it cannot be actuated at all.

SUMMARY OF THE INVENTION

It is an object of the present invention to develop a floating caliper disc brake of the aforementioned type, the straight-line guides of which are to the greatest possible extent resistant to dirt and corrosive media and still is simple in design and thus inexpensive in production.

A feature of the present invention is the provision of a floating caliper disc brake comprising a stationary brake support; and a floating caliper slidable coaxially with respect to the axis of a brake disc in two straight-line guides parallel to the axis of the brake disc; the caliper being capable of an elastic displacement transversely of the guides by action of braking torque; each of the straight-line guides including a guide groove in at least one of the support and caliper, and a projecting part associated with at least the other of the support and caliper, one of the groove and the projecting part being elastically deformable around a bending axis extending parallel to the guides at a distance from force vectors of the braking torque.

With this design the lever arm of the torque forces effects a deformation of the projecting parts engaging the guide grooves or deformation of the guide grooves themselves. Hereby, the points of contact, or lines of contact between projecting parts and guide groove walls are dislocated. Thus, the desired braking-away of the slidably engaged straight-line guide parts is achieved.

In an advantageous embodiment of this invention, the guide grooves of the straight-line guides are provided in the brake support, and close to each of the guide grooves a slot is provided extending transversely with respect to the guide plane.

With this embodiment, the brake support becomes elastic within the area of the guide grooves in the actuation direction of the brake torque produced during braking. Should the projecting parts become stuck in the guide grooves because the floating caliper has not been used for a prolonged period of time they will break away in that place as soon as the brake torque starts taking effect.

Since the brake support is resilient tangentially through the slots provided for by the invention, the guide surface in the brake support will tilt about a limitation surface of the projecting parts of the floating caliper, which causes the breaking away of the floating caliper by lever action.

In an advantageous embodiment of this invention, a filler with a predetermined clearance is inserted into each slot. This design enables the floating caliper to be displaceable to a precisely determined extent. As soon as the predetermined clearance in the slot is overcome the brake support can again be regarded as rigid.

The break-away effect realized by this invention will be reached with extremely simple and inexpensive means if, according to another embodiment of this invention, an elastic filler is inserted into each slot.

The basic principle of the invention can also be realized by another embodiment of this invention by arranging for the straight-line guides to be formed by confronting concave molds extending in the guide direction in the floating caliper and in the brake support, and in that between brake support and floating caliper a guide member, which is elastic transversely with respect to the guide direction and extends in the guide direction, is inserted in the confronting concave molds.

These guide parts then represent as a whole elastically deformable projecting parts. The guide parts being elastic transversely with respect to the guide direction, their bevel radius changes when the brake is applied so that the contact surface of the guide parts in the concave molds changes. This causes a lever effect which brings about a break-away of the guide parts in the concave molds.

In an advantageous embodiment of this invention, the guide part is a hollow cylinder. Such a hollow cylinder is inexpensive in production and can easily be provided with a sufficiently high amount of elasticity in the radial direction. In addition, there is the advantage of it being readily removable from the space between the two confronting molds so that the floating caliper can easily be taken off the brake support upwardly for pad change.

In another advantageous embodiment of this invention, the guide part is a coil spring. Compared to a hollow cylinder, the coil spring has functional advantages as a guide part. Similar to the hollow cylinder, it is elastic in radial direction so that the break-away takes place likewise as a consequence of the change of the bevel radius. In addition to this, however, the individual turns of the coil spring can be moved along as a result of the axial displacement of the brake caliper during braking before even the break-away of the turns in the concave mold of the brake caliper becomes necessary. The break-away may then take place not only as a result of the changed bevel radius with the brake torque in effect, but also by axial movement of the brake caliper. In simple words this means that through this design of the invention there is the possibility of accelerating the brake caliper in order to release jammed straight-line guides.

By inserting an elastic filler in the slots, or an elastic guide member in the confronting concave molds, a substantial change of the bevel radius takes place when braking, thus, causing a ready break-away.

If in another embodiment of this invention the coil springs project with a free end thereof into a boring extending transversely with respect to the concave mold of the brake support, the coil springs are secured against axial displacement in the concave molds of the brake support in the simplest way.

BRIEF DESCRIPTION OF THE DRAWING

Above-mentioned and other features and objects of this invention will become apparent by reference to the following description taken in conjunction with the accompanying drawing, in which.

DESCRIPTION OF THE PREFERRED EMBODIMENTS

Figure 1:
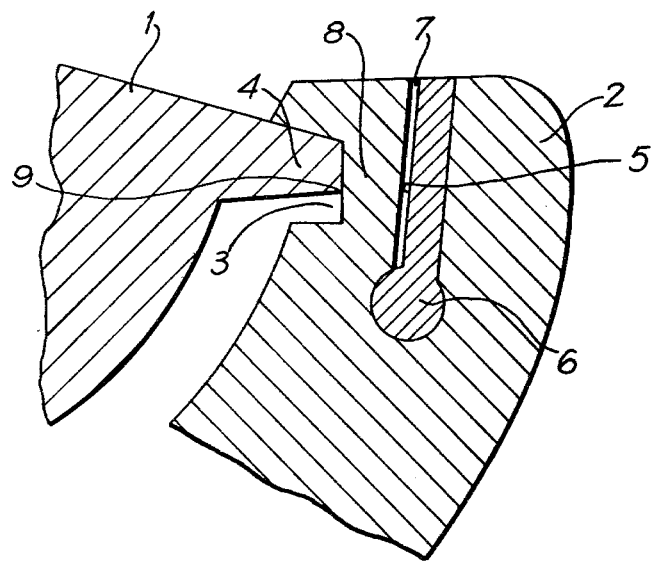
FIG. 1 is a cross sectional view through a first embodiment of a floating caliper disc brake in accordance with the principles of the present invention in the area of a straight-line guide.

FIG. 1 shows a floating caliper 1 which is slidable relative to a brake support 2. For this purpose, brake support 2 has guide grooves 3 into which floating caliper 1 extends with projecting parts 4.

A slot 5 is provided in brake support 2 close to each of guide grooves 3. A filler 6 with elastic characteristics is inserted into this slot 5. The dimensions of filler 6 are such that a slight clearance 7 remains in slot 5. By the arrangement of slot 5 in brake support 2 guide groove 3 is situated in a resilient zone 8 of brake support 2.

Should projecting part 4 become stuck in guide groove 3 because it has not been in operation for a prolonged period of time, it would break away again as soon as floating caliper 1 moves to the right, when viewing the drawing, and resilient zone 8 of brake support 2 would spring to the right. Projecting part 4 would then touch guide groove 3 only along a line 9. The surface contact of projecting part 4 would then convert into a line contact for the purpose of breaking away. Thus, a lever to break away floating caliper 1 is available.

Figure 2:
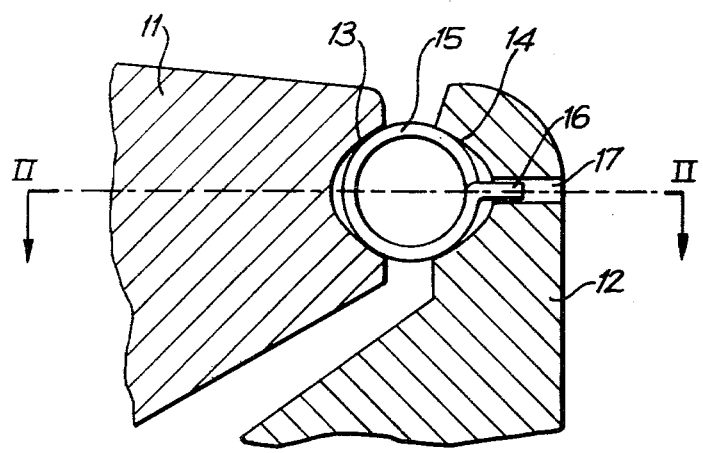
FIG. 2 is a cross sectional view through a second embodiment of a floating caliper disc brake in accordance with principles of the present invention in the area of a straight-line guide.
Figure 3:
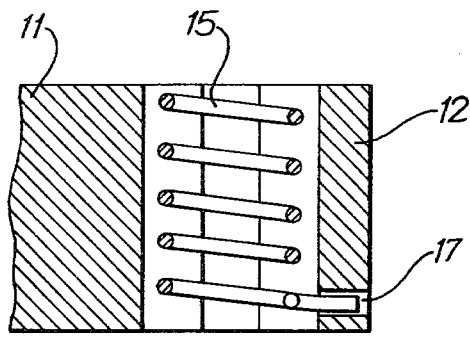
FIG. 3 is a cross sectional view along lines II—II of the floating caliper disc brake of FIG. 2.

FIGS. 2 and 3 show, similar to FIG. 1, a floating caliper 11 which is axially slidable relative to a brake support 12. For this purpose, floating caliper 11 is provided with concave molds 13 and brake support 12 is provided with concave molds 14. These concave molds 13 and 14 face each other.

A coil spring 15 is placed between concave molds 13 and 14, which extends with a free leg 16 into a boring 17 of brake support 12.

In the embodiment of FIGS. 2 and 3, concave molds 13 and 14 embrace a space which is oval in cross section and has coil spring 15 abutting it along four lines.

Figure 4:
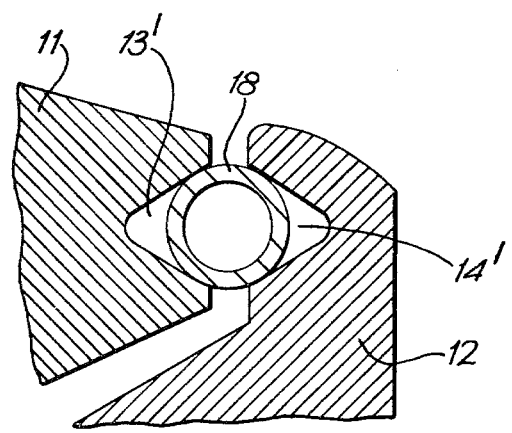
FIG. 4 is a cross sectional view through a third embodiment of a floating caliper disc brake in accordance with the principles of the present invention in the area of a straight-line guide.

The embodiment of FIG. 4 differs from that of FIGS. 2 and 3 because concave molds 13 and 14 embrace a prismatic space and a hollow cylinder 18 is provided as the guide member. Hollow cylinder 18 is elastic in the radial direction so that its contact surface with concave molds 13 and 14 changes when floating caliper 11 moves tangentially to the brake disc.

While I have described above the principles of my invention in connection with specific apparatus it is to be clearly understood that this description is made only by way of example and not as a limitation to the scope of my invention as set forth in the objects thereof and in the accompanying claims.

I claim:

1. A floating caliper disc brake comprising:

a stationary brake support having at least one straight-line guide groove therein spaced from an outer surface of said support;

a floating caliper axially slidable with respect to said support having at least one projecting part engaging said groove for axially guiding said caliper, said caliper being capable of an elastic displacement transversely of said groove due to action of a braking torque acting on said caliper; and a slot disposed in said support spaced from and transverse to said groove extending from said outer surface of said support to a point below said groove to render said support in the area between said groove and said slot elastically deformable around a bending axis extending parallel to said groove at a distance from force vectors of said braking torque, said elastically deformable area rendering the sliding of said caliper in said groove substantially resistant to dirt and corrosive media by dislocating the points of contact between said projecting part and said groove due to said braking torque.

2. A brake according to claim 1, further including a filler disposed in said slot with a predetermined clearance between said filler and a side wall of said slot.

3. A brake according to claim 2, wherein said filler is an elastic filler.

4. A brake according to claim 3. wherein
the end of said slot remote from said outer surface of said support is enlarged, and
said elastic filler substantially fills said enlarged end to anchor said elastic filler in said slot.

5. A brake according to claim 2, wherein
the end of said slot remote from said outer surface of said support is enlarged, and
said filler substantially fills said enlarged end to anchor said filler in said slot.

* * * * *